United States Patent
Seo

(10) Patent No.: US 9,874,756 B2
(45) Date of Patent: Jan. 23, 2018

(54) WEARABLE ELECTRONIC DEVICE

(71) Applicant: Samsung Electronics Co., Ltd., Suwon-si, Gyeonggi-do (KR)

(72) Inventor: Ho-Seong Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 14/953,135

(22) Filed: Nov. 27, 2015

(65) Prior Publication Data

US 2016/0223821 A1   Aug. 4, 2016

(30) Foreign Application Priority Data

Jan. 29, 2015  (KR) .................. 10-2015-0014159

(51) Int. Cl.
*G02B 27/01* (2006.01)
*G02C 11/00* (2006.01)

(52) U.S. Cl.
CPC .......... *G02B 27/0176* (2013.01); *G02C 11/10* (2013.01); *G02B 2027/0178* (2013.01)

(58) Field of Classification Search
CPC combination set(s) only.
See application file for complete search history.

(56) References Cited

U.S. PATENT DOCUMENTS

| | | | |
|---|---|---|---|
| 2004/0037639 A1* | 2/2004 | Ledingham | F16B 2/065 403/400 |
| 2004/0141148 A1* | 7/2004 | Chou | G02C 5/006 351/63 |
| 2010/0226712 A1* | 9/2010 | Kuroki | F16F 1/387 403/291 |
| 2013/0250503 A1 | 9/2013 | Olsson et al. | |
| 2014/0016800 A1 | 1/2014 | Dong et al. | |
| 2014/0218269 A1* | 8/2014 | Cazalet | G02B 27/0176 345/8 |
| 2016/0070110 A1* | 3/2016 | Ushakov | G08C 17/02 348/373 |

* cited by examiner

*Primary Examiner* — Carolyn R Edwards
*Assistant Examiner* — Deeprose Subedi
(74) *Attorney, Agent, or Firm* — Jefferson IP Law, LLP

(57) ABSTRACT

A wearable electronic device is provided. The wearable electronic device includes a display module configured to output an image, a wearing unit connected with the display module, and a detachment/attachment unit configured to allow the wearing unit to be detached from/attached to a user's eyeglass frame. The wearing unit is wearable on a user's body. The wearable electronic device may be variously implemented according to embodiments of the present disclosure.

14 Claims, 11 Drawing Sheets

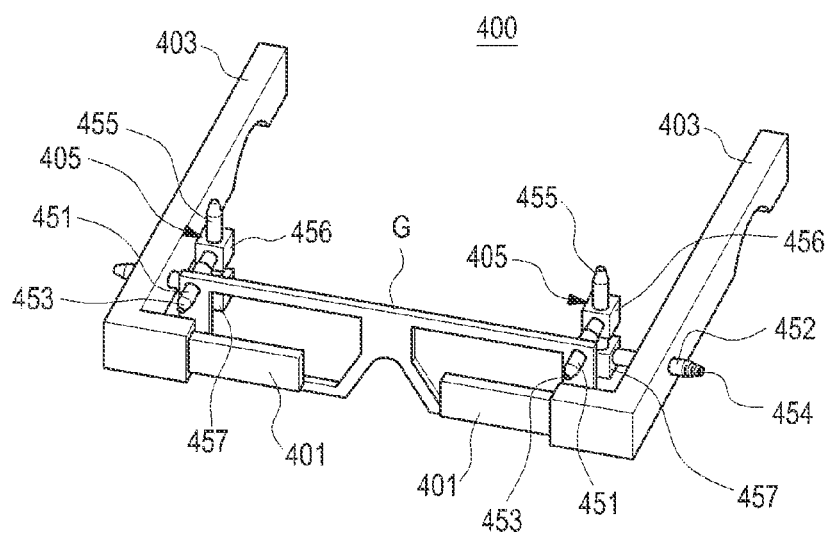
FIG.7
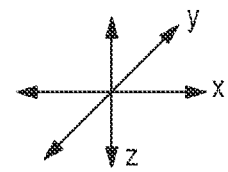
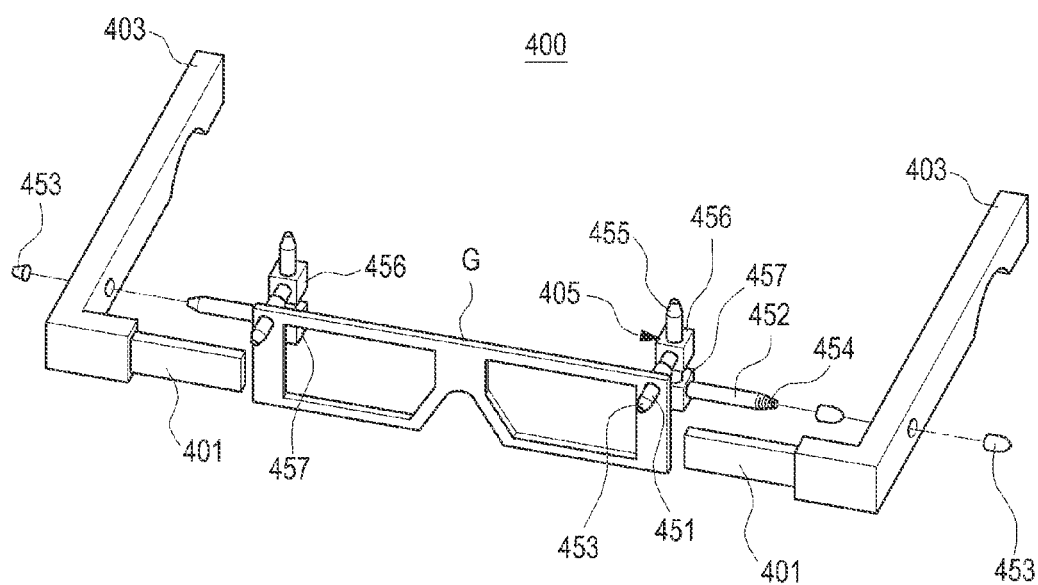
FIG.8
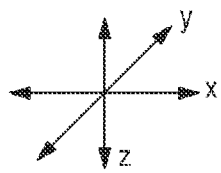

WEARABLE ELECTRONIC DEVICE

CROSS-REFERENCE TO RELATED APPLICATION(S)

This application claims the benefit under 35 U.S.C. §119 (a) of a Korean patent application filed on Jan. 29, 2015 in the Korean Intellectual Property Office and assigned Serial number 10-2015-0014159, the entire disclosure of which is hereby incorporated by reference.

TECHNICAL FIELD

The present disclosure relates to an electronic device. More particularly, the present disclosure relates to an electronic device which is wearable on a part of a body, for example, on a wrist or a head of a user the electronic device.

BACKGROUND

An electronic device indicates a device that performs specific functions according to programs incorporated therein, such as an electronic scheduler, a portable multimedia reproducer, a mobile communication terminal, a tablet personal computer (PC), an image/sound device, a desktop/laptop computer, or a vehicular navigation system, including a home appliance. For example, such an electronic device may output information stored therein as a sound or an image. As the integration of electronic devices has increased and a super-high speed and large capacity wireless communication has been popularized, various functions have recently been incorporated in a single mobile communication terminal. For example, in addition to a communication function, an entertainment function, such as a game, a multimedia function, such as music/video image reproduction, a communication and security function, e.g., mobile banking, and a function of schedule management or electronic wallet, are integrated in a single electronic device.

Electronic devices to be used in a portable manner, such as an electronic scheduler, a portable multimedia, reproducer, a mobile communication terminal, and a tablet PC, are generally equipped with a flat display device and a battery, and have a bar-type, a folder-type, or a sliding-type appearance due to the shape of the display device or the battery. Currently, as display devices and batteries have been miniaturized with the advancement in performance thereof, electronic devices wearable on a part of a body, such as a wrist or a head, have appeared.

In order to allow an electronic device to be carried or worn on a part of a body, miniaturization, weight-reduction, and wearing-suitable shape design of the electronic device, and a battery with a sufficient capacity may be needed.

Ordinary wearable electronic devices have a uniform appearance so that a user cannot select a desired design. More particularly, among the wearable electronic devices, when smart eyeglasses are manufactured in the same design, the user's personality may be disregarded.

Further, the wearable electronic devices having a uniform appearance are hardly suited for various users' face shapes, which may cause a poor wearing feeling to the users.

In addition, the wearable electronic devices may have a limit in providing a uniform display quality to all the individual users because the focal points for projecting a virtual image vary depending on the various positions of the users' eyes.

Therefore, a need exists for a wearable electronic device improved in wearing feeling.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wearable electronic device improved in wearing feeling.

Another aspect of the present disclosure is to provide a wearable electronic device having a design desired by a user.

Another aspect of the present disclosure is to provide a wearable electronic device in which focal points may be optimized depending on a user's face shape and the positions of the user's eyes.

In accordance with an aspect of the present disclosure, a wearable electronic device is provided. The wearable electronic device includes a display module configured to output an image, a wearing unit connected with the display module, and a detachment/attachment unit configured to allow the wearing unit to be detached from/attached to a user's eyeglass frame. The wearing unit may be wearable on a user's body.

The detachment/attachment unit may further include a case connected to the first and second connection parts, and a central part provided to be movable in the case, the first connection part may include a first thread, the second connection part may include a second thread, the case may include first and second screw holes formed to correspond to the first and second screw threads, respectively, and the first and second connection parts may be moved along the first and second screw holes, respectively.

According to various embodiments of the present disclosure, the wearable electronic device may be provided in a design desired by a user since the display module may be mounted on an eyeglass frame used by the user. In addition, the detachment/attachment unit may optimize focal points to various users' body types (e.g., face shapes or positions of eyes) by allowing the display module and the wearing unit to be attached to/detached from the eyeglass frame as well as allowing the positions of the display module and a lens of the eyeglasses to be relatively changed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a perspective view illustrating a wearable electronic device according to an embodiment of the present disclosure;

FIG. 8 is an exploded perspective view illustrating a wearable electronic device according to an embodiment of the present disclosure;

DETAILED DESCRIPTION

Figure 1:
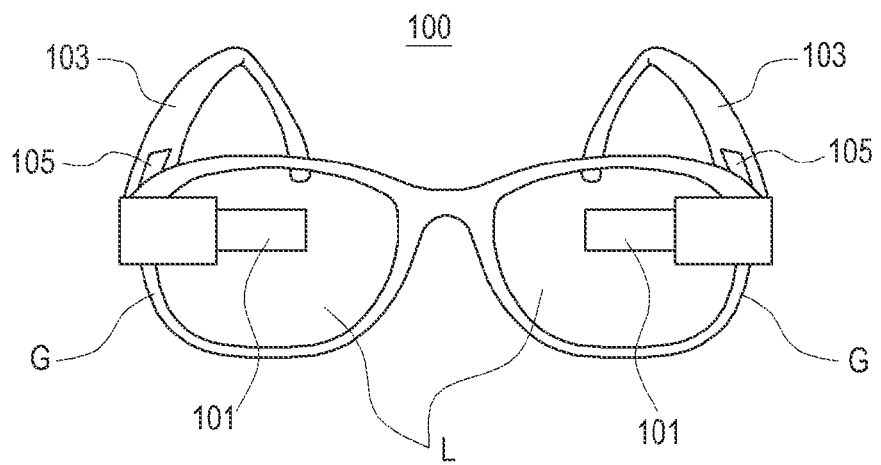
FIG. 1 is a perspective view illustrating a wearable electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the expression "have", "may have", "include", or "may include" refers to the existence of a corresponding feature (e.g., a numeral, a function, an operation, or a constituent element, such as a component), and does not exclude one or more additional features. In embodiments of the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure. It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposer between them.

As used herein, the term "user" may indicate a person who uses an electronic device or a device (e.g., an artificial intelligence electronic device) that uses an electronic device.

Figure 2:
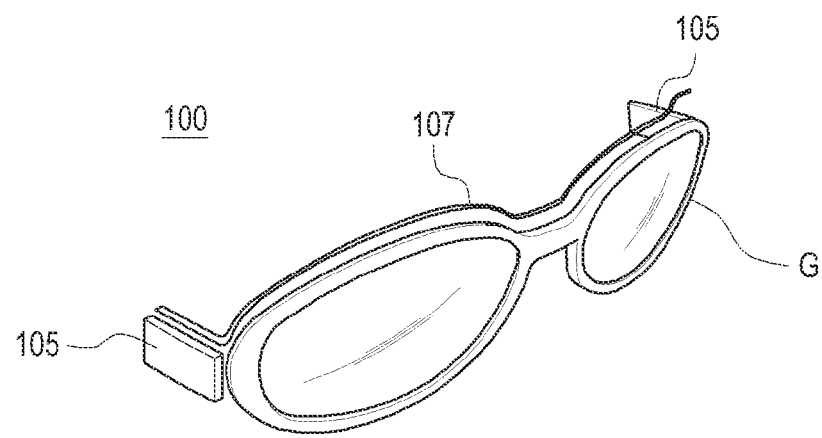
FIG. 2 is an exploded perspective view illustrating a wearable electronic device according to an embodiment of the present disclosure.
Figure 2:
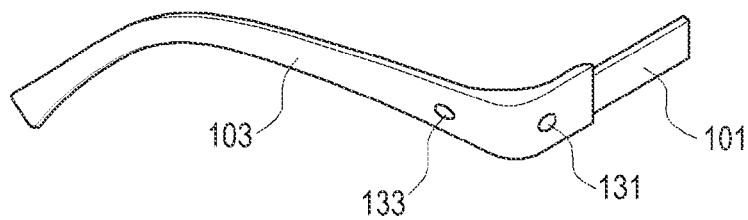

FIG. 1 is a perspective view illustrating a wearable electronic device according to an embodiment of the present disclosure. FIG. 2 is an exploded perspective view illustrating a wearable electronic device according to an embodiment of the present disclosure.

Referring to FIGS. 1 and 2, according to one of various embodiments of the present disclosure, a wearable electronic device 100 may include a pair of display modules 101, a pair of wearing units 103, and a pair of detachment/attachment units 105 that allow the wearing units 103 to be attached to/detached from a user's eyeglass frame.

Here, the eyeglass frame G may include a rim, on which eyeglass lenses L are mounted, and temples corresponding to eyeglass bows.

The display modules 101 may directly project an image on the user's visual line, e.g., to the user's eyes. While the present embodiment of the present disclosure illustrates a configuration in which one pair of display modules 101 are disposed, only one display module 101 may be disposed. The display modules 101 are provided with a display device, such as a liquid crystal display device or an organic light emitting diode, and a light source to be capable of outputting an image.

The wearing units 103 may be connected to the display modules 101 so as to support the display modules 101. The wearing units 103 may be worn on the user's body. For example, the wearing units 103 may be configured to be in contact with or seated on a part of the user's body. The wearing units 103 may provide a function of temples corresponding to bows of an ordinary eyeglass structure. The wearing units 103 may be provided with a circuit board and a battery.

The circuit board may be provided as a main circuit board including a driving circuit of the display modules 101 and a processor for processing, e.g., image information. In addition, the circuit board may be provided as an auxiliary circuit board, on which an interface with the user, a communication circuit and various connectors that provide a connection to other electronic devices or a commercial communication network, and a sensor module are mounted. In addition, a microphone and a speaker for inputting and outputting sounds may also be disposed on or adjacent to the circuit board. Of course, the circuit arrangement of the circuit board and functions according to the circuit arrangement are not limited to those described above, and may be variously adjusted as needed. The sensor module may include, for example, a proximity sensor, an illuminance sensor, a gyro sensor, a camera module, a visual line tracer, a geomagnetic sensor, and an accelerometer, and the various sensors that form the sensor module do not necessarily have to be disposed on one of the circuit boards described above. For example, a camera module 131 may be mounted on the wearing units 103 to be close to the user's visual line. In addition, the sensor modules as described above may detect information for a peripheral environment required for setting an optimal use environment while monitoring, for example, the use environment of the wearable electronic device 100. For example, the illuminance sensor mounted on the sensor module may detect a peripheral illuminance so as to provide information for adjusting the brightness and resolution of the display modules 101. In disposing an illuminance sensor 133, the illuminance sensor may be mounted on the wearing unit 103 closest to the user's eyes so as to detect illuminance closest to the peripheral illuminance felt by the user. However, the sensors mounted on the wearing units 103 are not limited to the illuminance sensor, and may be various sensors described above. In addition, the battery is to provide power to, for example, the circuit board and the display module 101, and may be accommodated in the wearing units 103.

According to one of various embodiments of the present disclosure, the wearable electronic device 100 may further include a power connection unit 107 that interconnects a plurality of circuit boards as described above.

The power connection unit 107 may electrically connect any one of the circuit boards mounted in the wearing units 103 and another one of the circuit boards with each other. The power connection unit 107 may be wired through the eyeglass frame G to connect, for example, the circuit boards disposed in the respective wearing units 103 with each other. In order to provide a transmission/reception route of various control signals and data between the main circuit board and the auxiliary circuit board and to provide a transmission/reception route for control signals of the display modules 103, the power connection unit 107 may electrically connect the circuit boards and the display modules 101 with each other. The functions and roles of the power connection unit 107 may be variously changed. When a plurality of power connection units 107 are provided, the number of power connection units 107 may also be properly adjusted. For example, the power connection unit 107 may electrically connect the battery and the display modules 103 with each other so that the power of the battery can be supplied to the display modules 103. The power connection unit 107 may be configured using a coaxial cable, may have various transmission line structures, such as a flexible printed circuit board (FPCB). However, the power connection unit 107 is not limited to a cable form and may be mounted on each of the circuit boards to be capable of transmitting/receiving signals in various manners, such as a wireless communication (e.g., a 60 GHz wireless communication).

The detachment/attachment units 105 may allow the wearing units 103 to be attached to/detached from the user's eyeglass frame G. The detachment/attachment units 105 may be connected to both sides of the eyeglass frame G, respectively, so as to allow the wearing units 103 to be coupled to or removed from the eyeglass frame G. For example, the detachment/attachment units 105 may be fitted to or separated from the wearing units 103, and attached to or detached from the eyeglass frame G through bolt coupling. However, without being limited to fitting or bolt coupling, the detachment/attachment units 105 may have various structures that allow the eyeglass frame G and the wearing units 103 to be attached to/detached from each other.

As described above, according to one of various embodiments of the present disclosure, the wearable electronic device 100 allows the display modules 101 and the wearing units 103 to be attached to/detached from an ordinary eyeglass frame G using the detachment/attachment units 105. Thus, a user may select an eyeglass frame suitable for the user's face shape and arrangement of eyes, and optimize the focal point of the image output from the display modules 101 using the wearable electronic device 100. In addition, it is easy to replace the eyeglass frame G so that it is easy to perform maintenance of the eyeglass frame G, and the user may select a desired design for the eyeglass frame.

Figure 3:
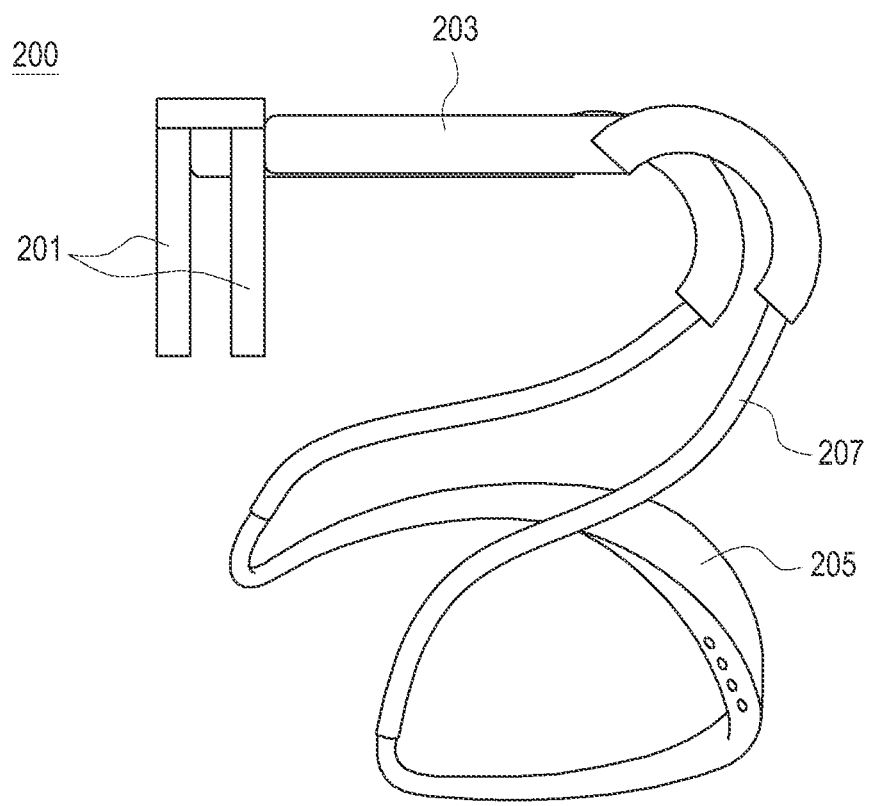
FIG. 3 is a perspective view illustrating a wearable electronic device according to an embodiment of the present disclosure.
Figure 4:
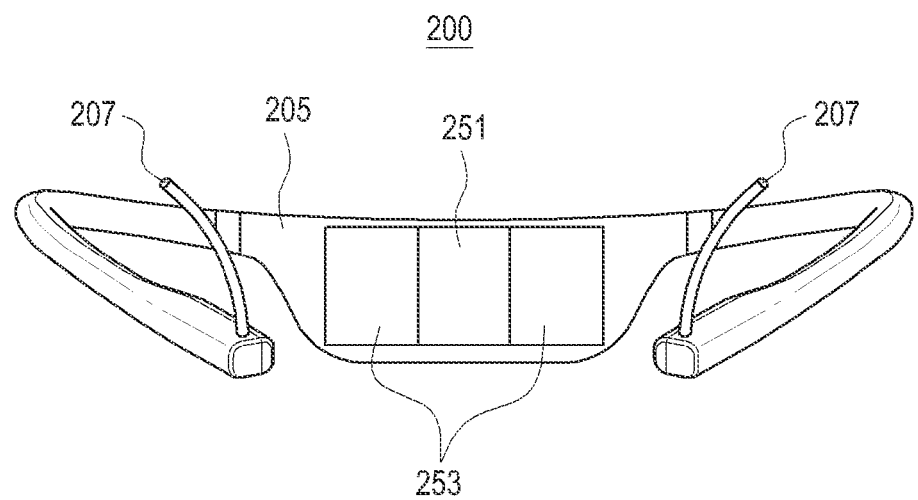
FIG. 4 is a rear side perspective view illustrating a wearable electronic device according to an embodiment of the present disclosure.
Figure 5:
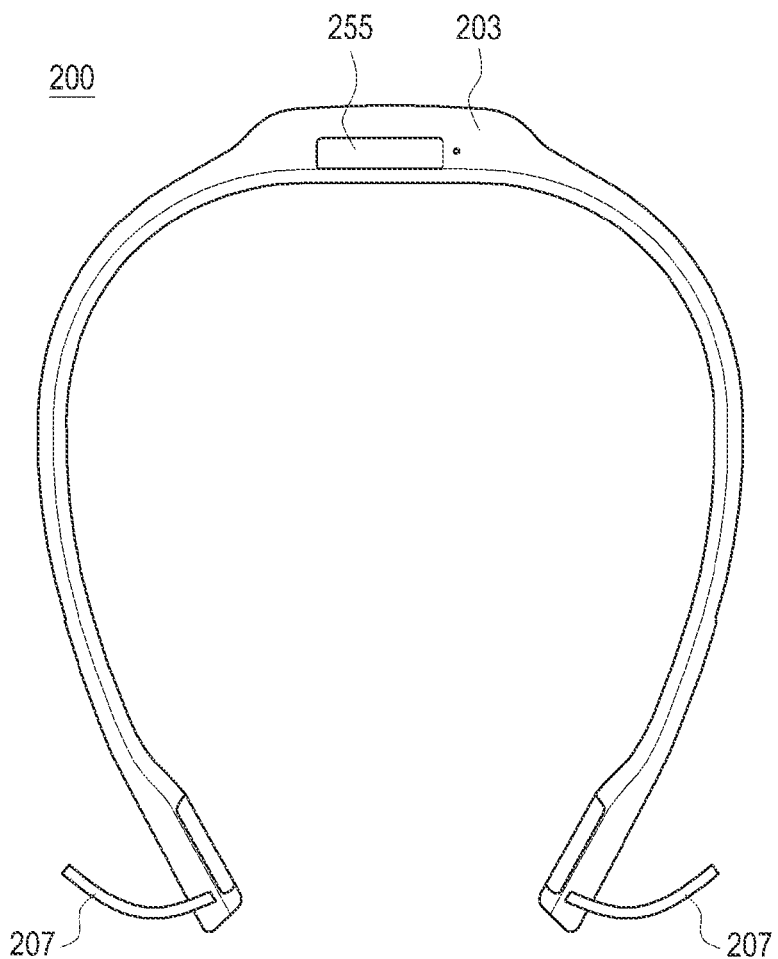
FIG. 5 is a plan view illustrating a wearable electronic device according to an embodiment of the present disclosure.

FIG. 3 is a perspective view illustrating a wearable electronic device according to an embodiment of the present disclosure. FIG. 4 is a rear side perspective view illustrating a wearable electronic device according to an embodiment of the present disclosure. FIG. 5 is a plan view illustrating a wearable electronic device according to an embodiment of the present disclosure.

Referring to FIGS. 3 to 5, according to another one of various embodiments of the present disclosure, a wearing unit 203 applied to a wearable electronic device 200 may further include a neckband 205.

The neck band 205 may be worn on a user's neck. Unlike the embodiment described above, a circuit board 251 and a battery(s) 253 may be provided in the neck band 205. In addition, a power connection unit 207 may electrically connect the neck band 205 and display modules 201 with each other through the inside of the wearing unit 203. In addition, the neck band 205 may be provided with an input unit 255 so that the user may input a desired function of the wearable electronic device 200 therethrough.

In this way, according to another one of various embodiments of the present disclosure, as the relatively heavy circuit board 251 and battery 253 are mounted on the neck band 205, the wearable electronic device 200 may spread the weight of wearing unit 203 mounted on the user's body (e.g., ears and nose). In addition, since the neck band 205 is worn on the user's neck, it is possible to increase the capacity of the battery 253 so as to increase the use time of the wearable electronic device 200.

Figure 6:
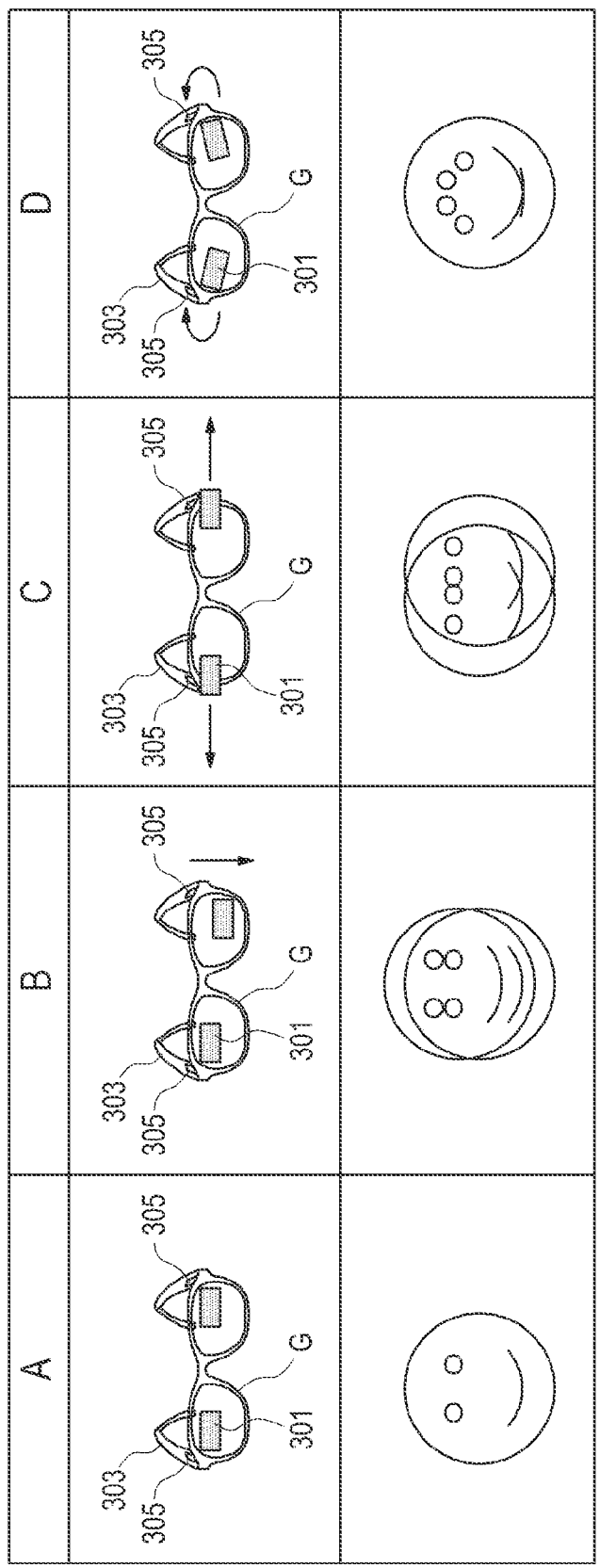
FIG. 6 is a view illustrating focal points of a user's eyes according to a positional change of display modules in front of the user's eyes in an ordinary wearable electronic device according to an embodiment of the present disclosure.

FIG. 6 is a view illustrating focal points of a user's eyes according to a positional change of display modules in front of the user's eyes in an ordinary wearable electronic device according to an embodiment of the present disclosure. Here, the positions of the display modules in front of the user's eyes illustrated in FIG. 6 may be changed depending on various face shapes and positions of the eyes.

In addition, an x-axis, a y-axis, and a z-axis indicate directions perpendicular to each other. Here, the term, "perpendicular," is not used to define a correct 90 degree angle in the physical meaning, but to conveniently describe a moving direction or a rotating direction.

Referring to FIG. 6, according to one of various embodiments of the present disclosure, a pair of display modules 301, a pair of wearing units 303, and a pair of detachment/attachment units 305 that allow the wearing units 303 to be attached to/detached from a user's eyeglass frame G are equivalent to the pair of display modules 101, the pair of wearing units 103, and the pair of detachment/attachment units 105 that allow the wearing units 103 to be attached to/detached from a user's eyeglass frame G, respectively, of FIGS. 1 and 2.

Item A in FIG. 6 illustrates a case in which the focal point of an image output from the display modules 301 disposed in front of the user's eyes is aligned with the user's eyes. Item B in FIG. 6 illustrates a case in which one of the display modules 301 disposed in front of the user's eyes is moved in the z-axis direction due to the user's face shape or positions of eyes so that the focal point of the image output from the display modules 301 is not aligned with the user's eyes. Item C in FIG. 6 illustrates a case in which one of the display modules 301 disposed in front of the user's eyes is moved in the x-axis direction due to the user's face shape or positions of eyes so that the focal point of the image output from the display modules 301 is not aligned with the user's eyes. Item D in FIG. 6 illustrates a case in which at least one of the display modules 301 disposed in front of the user's eyes is rotated about the y-axis direction due to the user's face shape or positions of eyes so that the focal point of the image output from the display modules 301 is not aligned with the user's eyes.

Referring to FIG. 6, since the user's focal points are changed depending on the user's face shape or positions of eyes, the relative positions of the user's eyes and the display modules 301 may need to be adjusted. Methods for addressing this issue will be described below.

Figure 9:
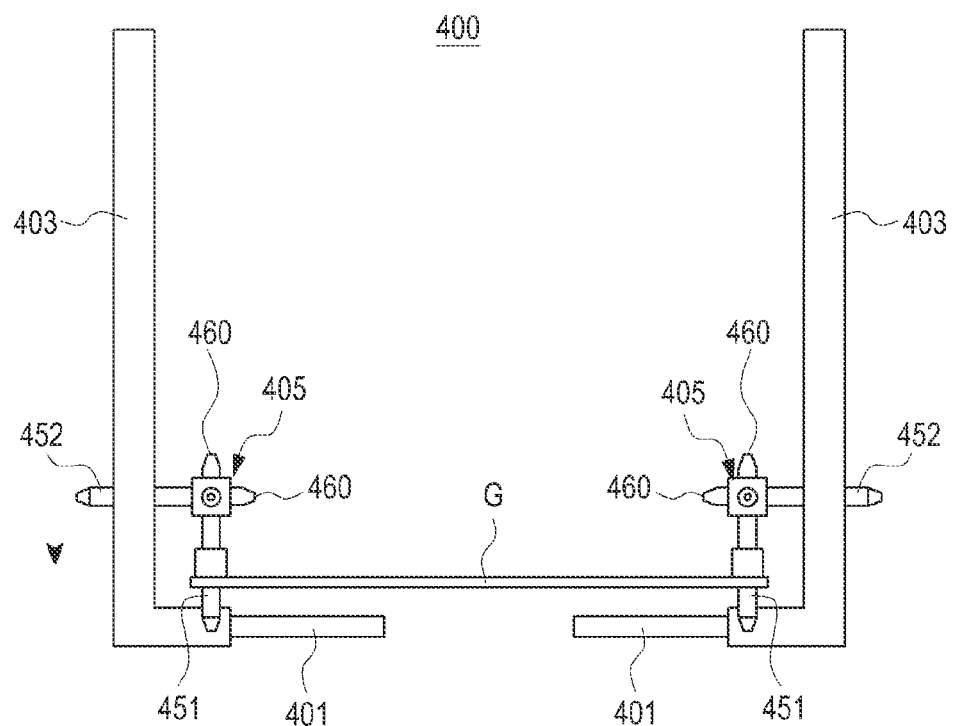
FIG. 9 is a plan view illustrating a wearable electronic device according to an embodiment of the present disclosure.
Figure 10:
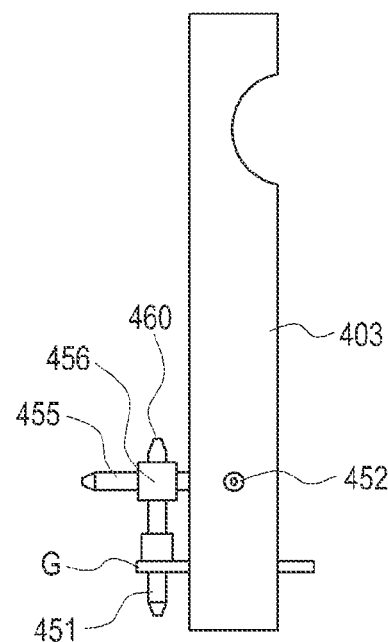
FIG. 10 is a side view illustrating a wearable electronic device according to an embodiment of the present disclosure.
Figure 11:
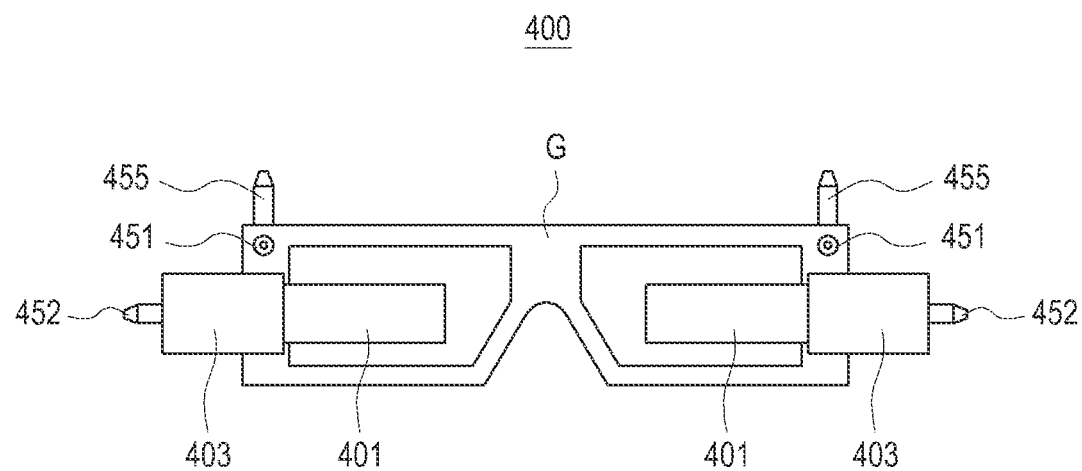
FIG. 11 is a front view illustrating a wearable electronic device according to an embodiment of the present disclosure.

FIG. 7 is a perspective view illustrating a wearable electronic device according to an embodiment of the present disclosure. FIG. 8 is an exploded perspective view illustrating a wearable electronic device according to an embodiment of the present disclosure. FIG. 9 is a plan view illustrating a wearable electronic device according to an embodiment of the present disclosure. FIG. 10 is a side view illustrating a wearable electronic device according to an embodiment of the present disclosure. FIG. 11 is a front view illustrating a wearable electronic device according to an embodiment of the present disclosure. Descriptions of components of a wearable electronic device 400 according to an embodiment of the present disclosure will be omitted when the components are similar to those described above, and the following description will be concentrated on a detachment/attachment unit.

Referring to FIGS. 7 to 11, according to an embodiment of the present disclosure, a detachment/attachment unit(s) 405 applied to the wearable electronic device 400 may include a first connection part(s) 451 and a second connection part(s) 452.

The first connection parts 451 may be connected to the eyeglass frame G. The first connection parts 451 may have a rod shape. In addition, the eyeglass frame G may have holes corresponding to the first connection parts 451 so that the first connection parts 451 may be inserted into the holes of the eyeglass frame G to be connected to the eyeglass frame G. On the contrary, the first connection parts 451 may be may be removed from the holes of the eyeglass frame G.

In addition, the second connection parts 452 may be connected to wearing units 403. The second connection parts 452 also have a rod shape like the first connection parts 451. In addition, the wearing units 403 have holes corresponding to the second connection parts 452 so that the second connection parts 452 may be inserted into the holes of the wearing units 403 to be connected. On the contrary, the second connection parts 452 may be removed from the holes of the wearing units 403.

As described above, according to an embodiment of the present disclosure, as the wearable electronic device 400 uses detachment/attachment units 405, each of which includes the first connection part 451 and the second connection part 452, the wearing units 403 may be attached to/detached from the eyeglass frame G. Thus, the wearable electronic device 400 may be coupled to or separated from various structures of eyeglass frames G.

In addition, each first connection part 451 penetrates the eyeglass frame G to be rotatable about a first rotation axis. Here, the first rotation axis may be the y-axis. As described above, the x-axis, the y-axis, and the z-axis may be perpendicular to each other. In addition, the first rotation axis may be the central axis of the first connection part 451. For example, each first connection part 451 is rotatable about the central axis thereof. The first connection part 451 may be provided with a first thread. In addition, each wearing unit 403 may further include a first fixing part 453 screw-coupled to the first thread so as to limit the rotation of the first connection part 451 in relation to the eyeglass frame G. Thus, when the first fixing part 453 is screw-coupled with the first connection part 451 to be in contact with the eyeglass frame G, the first connection part 451 may be rigidly fixed to the eyeglass frame G.

Each second connection part 452 penetrates the wearing unit 403 to be rotatable above a second rotation axis that is perpendicular to the first rotation axis. Here, the second rotation axis may be the x-axis. In addition, the second rotation axis may be the central axis of the second connection part 452.

For example, the second connection part 452 is rotatable about the central axis. As a result, in the case where each of the first connection parts 451 is connected and fixed to the eyeglass frame G, as the second connection parts 452 are rotated about the second rotation axis, the eyeglass frame G may be rotated about the second rotation axis. For example, the relative position between the eyeglass frame G and the display module may be adjusted by rotating the second connection parts 452.

In addition, each of the second connection parts 452 may be provided with a second thread. In addition, each detachment/attachment unit 405 may further include a second fixing part 454 screw-coupled to the second thread so as to limit the rotation of the second connection part 452 for the wearing unit in relation to the eyeglass frame G. Thus, when the second fixing parts 454 are screw-coupled to the second connection parts 452 to be in contact with the wearing units 403, the second connection parts 452 may be rigidly fixed to the wearing units 403. In addition, after the user rotates the second connection parts 452 about the second rotation axis, the rotation angle of the eyeglass frame G may be maintained by the second fixing parts 454.

In addition, the detachment/attachment units 405 may allow the positions of display modules 401 in relation to the eyeglass frame G to be changed by rotating the first and second connection parts 451 and 452. Each of the detachment/attachment units 405 may include cases 456 and 457, and a central part 455.

The cases 456 and 457 serve as a body of each detachment/attachment unit 405, in which the first connection part 451 may be connected to one case 456 and the second connection part 452 may be connected to another case 457. However, the cases 456 and 457 may be integrally fabricated with each other without being separated from each other. The cases 456 and 457 may be formed with first and second screw holes corresponding to the first and second screw threads. The first and second connection parts 451 and 452 may be moved along the first and second screw holes. As the first connection parts 451 are moved along the y-axis, the distance between the front side of the eyeglass frame G and the display modules 401 may be adjusted. In addition, as the second connection parts 452 are moved along the x-axis, the display modules 401 may be moved in the x-axis direction in relation to the eyeglass frame G.

In this way, by moving the first and second connection parts 451 and 452 along the x-axis and the y-axis, respectively, the relative position between the eyeglass frame G and the display modules 401 may be adjusted.

Each central part 455 may be provided to be movable in the cases 456 and 457. The central part 455 may be formed in a rod shape. The cases 456 and 457 may be provided with a case hole corresponding to the central part 455. For example, the central part 455 may be moved in the z-axis direction along the case hole. Here, the z-axis direction may be parallel to the longitudinal direction of the central part 455. For example, as the central part 455 is moved, the central part 455 may change the positions of the first and second connection parts 451 and 452 in the y-axis direction. The detachment/attachment unit 405 may further include an anchoring bolt 460 coupled to the cases 456 and 457.

Figures 12, 13:
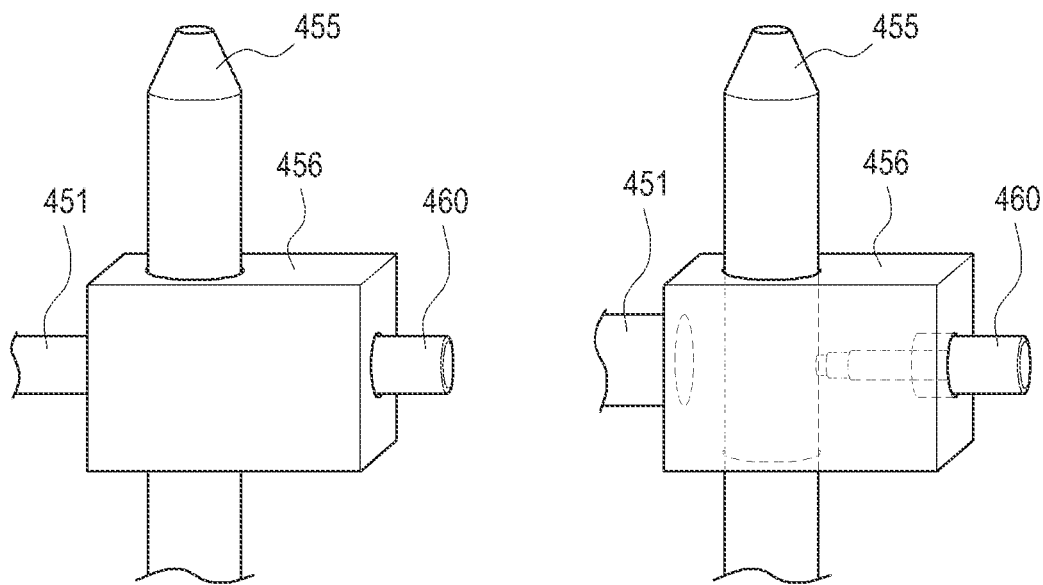
FIG. 12 is a perspective view illustrating a detachment/attachment unit applied to a wearable electronic device according to an embodiment of the present disclosure.
FIG. 13 is a perspective view illustrating an inside of a case applied to a wearable electronic device according to an embodiment of the present disclosure.
Figure 14:
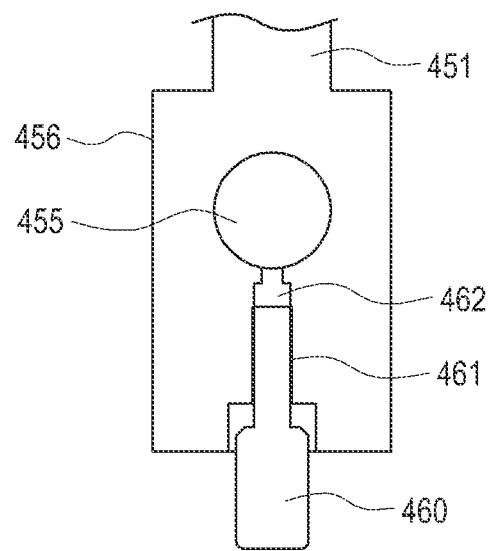
FIG. 14 is a sectional view illustrating a detachment/attachment unit applied to a wearable electronic device according to an embodiment of the present disclosure.

FIG. 12 is a perspective view illustrating a detachment/attachment unit applied to a wearable electronic device according to an embodiment of the present disclosure. FIG. 13 is a perspective view illustrating an inside of a case applied to a wearable electronic device according to an embodiment of the present disclosure. FIG. 14 is a sectional view illustrating a detachment/attachment unit applied to a wearable electronic device according to an embodiment of the present disclosure.

Referring to FIGS. 12 to 14, the anchoring bolt 460 may be formed with an anchoring bolt thread 461. In addition, one end 462 of the anchoring bolt 460 is provided inside the cases 456 and 457 and may be formed of an elastic material. The end 462 of the anchoring bolt may be rubber or a spring. However, the end 462 of the anchoring bolt may be formed of any elastic material without being limited to the rubber or the spring. The anchoring bolt 460 may be fixed to the cases 456 and 457 by coining in contact with the central part 455 within the cases 456 and 457.

As described above, after the central part 455 is moved to a desired position in the z-axis direction in relation to the first and second connection parts 451 and 452, the central part 455 may be fixed to the cases 456 and 457 using the anchoring bolt 460.

As described above, according to an embodiment of the present disclosure, the wearable electronic device 400 is configured such that the positions of the display modules 401 may be changed in relation to the eyeglass frame G by rotating and/or moving the display modules 401 with reference to the x-axis, the y-axis, and z-axis so that an image output from the display modules may be optimized to the user's focal points.

Figure 15:
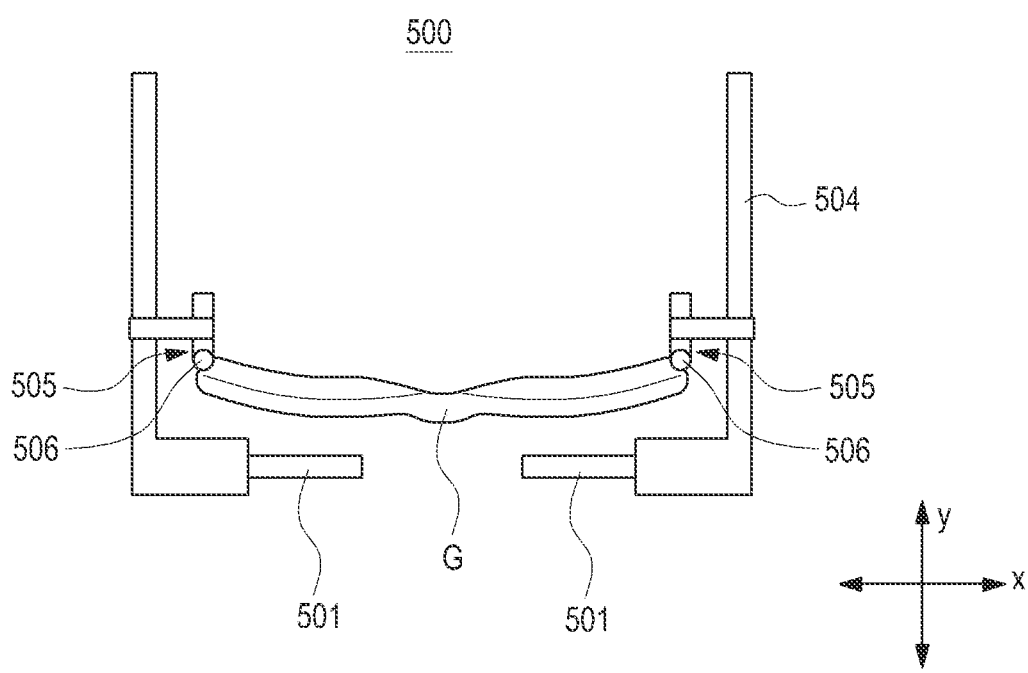
FIG. 15 is a plan view illustrating a wearable electronic device according to an embodiment of the present disclosure.
Figure 16:
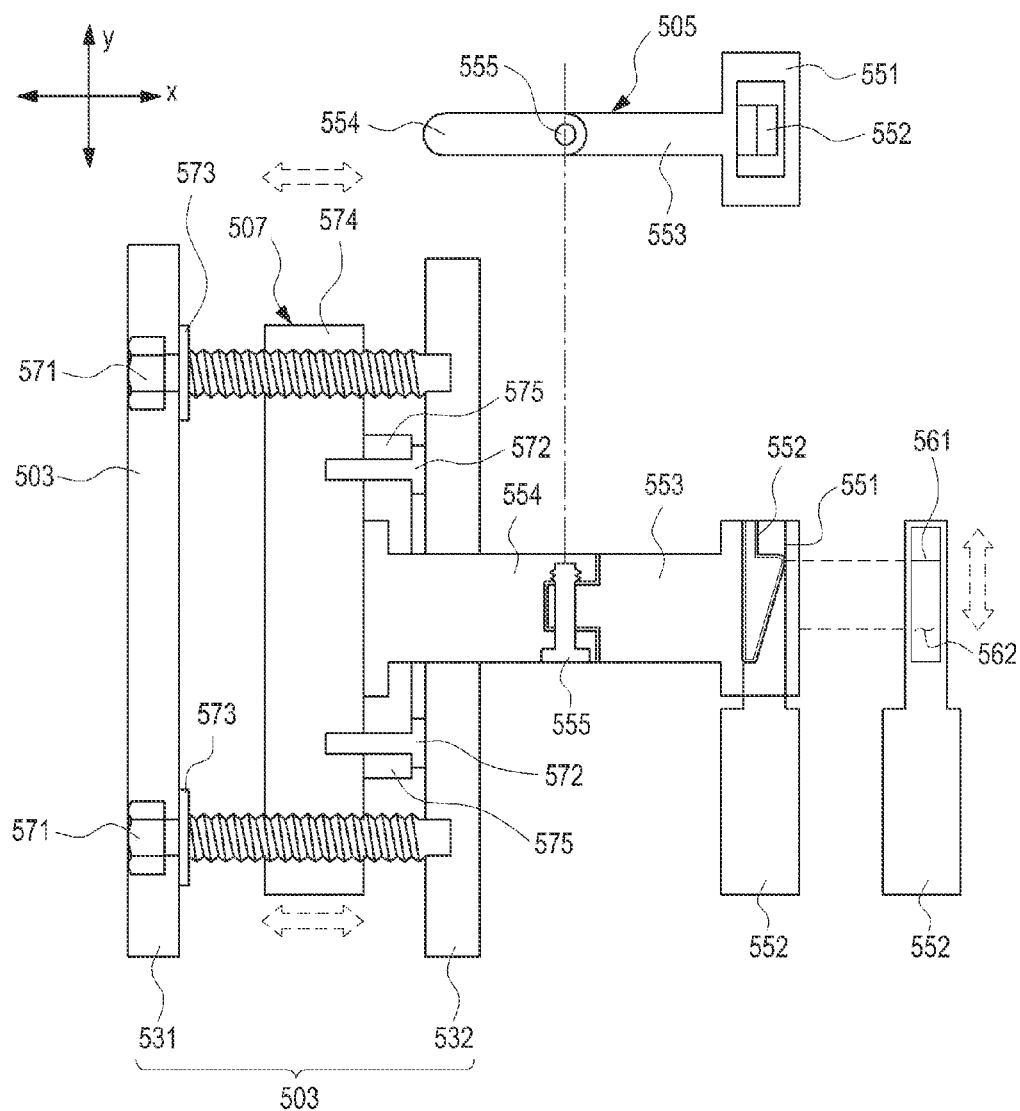
FIG. 16 is a sectional view illustrating a detachment/attachment unit applied to a wearable electronic device according to an embodiment of the present disclosure.
Figure 17:
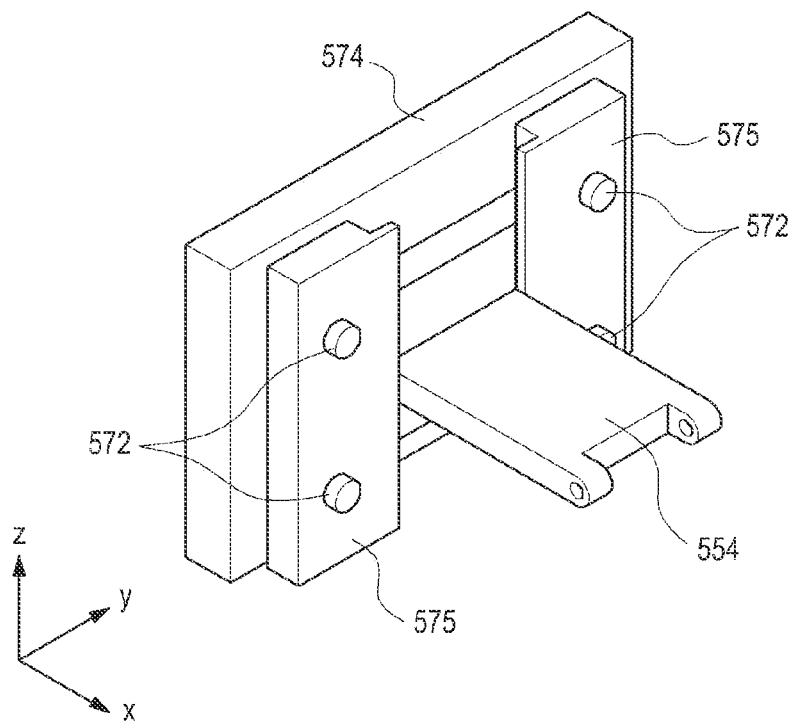
FIG. 17 is a perspective view illustrating a second adjusting part applied to a wearable electronic device according to an embodiment of the present disclosure.

FIG. 15 is a plan view illustrating a wearable electronic device according to an embodiment of the present disclosure. FIG. 16 is a sectional view illustrating a detachment/attachment unit applied to a wearable electronic device according to an embodiment of the present disclosure. FIG. 17 is a perspective view illustrating a second adjusting part applied to a wearable electronic device according to an embodiment of the present disclosure.

Before describing the present embodiment of the present disclosure, descriptions on the components similar to those described above will be omitted, and the following description will be concentrated on the detachment/attachment unit.

Referring to FIGS. 15 to 17, according to an embodiment of the present disclosure, a detachment/attachment unit 505 applied to a wearable electronic device 500 may include first hinges 506, bodies 551 and 552, first and second adjusting parts 553 and 554, and second hinges 555.

The first hinges 506 may be connected with an eyeglass frame G in a hinged manner. In addition, the first hinges 506 may be symmetrically disposed with reference to the eyeglass frame G. The bodies 551 and 552 may be connected with each of the first hinges 506. The bodies 551 and 552 may change the position of the eyeglass frame G along the hinge axes of the first hinges 506. Here, the hinge axes may be parallel to the z-axis. A first adjusting part 553 may be connected to the body 551. The first adjusting part 553 may extend in the vertical direction from the body 551. A second adjusting part 554 may be connected to a wearing unit 504. The second hinge 555 may connect the first and second adjusting parts 553 and 554 with each other in a hinged manner. The second adjusting part 554 is rotatable about the y-axis by the second hinge 555. As a result, when the first and second hinges 506 and 555 are rotated, the position of the second adjusting part 554 in relation to the first adjusting part 553 may be changed. For example, according to the positional change between the first adjusting part 553 and the second adjusting part 554, the position between the wearing units 504 and the eyeglass frame G may be changed. In addition, the relative position of the wearing units 504 with respect to the eyeglass frame G may be changed by rotating the first and second hinges 506 and 555 disposed at each of both sides of the eyeglass frame G.

The bodies 551 and 552 may include a first body 551, a second body 552, and an elastic unit 561. The first body 551 may be connected with the first adjusting part 553. The second body 552 may be connected with the first hinge 506 and moved inside the first body 551. The first body 551 may include a body hole, within which the second body 552 is movable. The second body 552 is movable along the longitudinal direction of the second body 552. Here, the longitudinal direction of the second body 552 corresponds to the y-axis direction. The elastic unit 561 may be provided between the first body 551 and the second body 552 so as to limit the movement of the second body 552. The elastic unit 561 may be a leaf spring. The elastic unit 561 formed of the leaf spring may be fixed to the first body 551 and connected to the second body 552. The second body 552 may have an accommodation recess, in which the elastic unit 561 is accommodated. When an external force exceeding a certain level is applied, the elastic unit 561 may be moved within the accommodation recess, and when an external force does not exceed the certain level, the elastic unit 561 may be stopped by coming in contact with the first and second bodies 551 and 552.

As described above, according to yet another one of various embodiments of the present disclosure, the wearable electronic device 500 may change the positions of display modules 501 along the y-axis direction in relation to the eyeglass frame G by adjusting the movements of the second bodies 552. For example, the display modules 501 may be moved back and forth in front of the eyeglass frame G so as to optimize the focal points of the display modules 501.

In addition, each wearing unit 504 may further include a guide unit 507 that changes the position of a second adjusting part 554. The guide unit 507 may further include a plurality of guide bolts 571 and a plate 574.

In addition, the wearing unit 504 may include a first inner wall 531 and a second inner wall 532. A circuit board or a battery as described above may be mounted between the first inner wall 531 and the second inner wall 532. In addition, a guide space provided with the guide unit 507 may be formed between the first inner wall 531 and the second inner wall 532.

The plurality of guide bolts 571 may be rotatably mounted in the wearing unit 504. The plurality of guide bolts 571 may be disposed in the guide space between the first inner wall 531 and the second inner wall 532. In addition, each of the guide bolts 571 may include a snap ring 573. The snap rings 573 may prevent the guide bolts 571 from being released from the guide space.

The plate 574 may be positioned within the wearing unit 504 and screw-coupled with the plurality of guide bolts 571 so that the plate 574 may be moved in a first direction within the wearing unit 504 as at least one of the plurality of guide bolts 571 is rotated. Here, the first direction may correspond to the x-axis direction. As described above, the x-axis may be perpendicular to the y-axis and the z-axis. The plate 574 may be positioned within the guide space. The other end of the second adjusting part 554 may be arranged to be in contact with the plate. The second adjusting part 554 may be moved within the wearing unit 504 together with the plate 574. For example, since the plate 574 is movable in the guide space between the first inner wall 531 and the second inner wall 532, the second adjusting part 554 is movable in the y-axis direction by a distance corresponding to the guide space. As the second adjusting part 554 is moved in the y-axis direction, the position of the display module 501 connected to the wearing unit 504 may be changed in the y-axis direction in relation to the eyeglass frame G.

The second adjusting part 554 may include a flange portion protruding in a direction parallel to the plate 574 from the second adjusting part 554. In addition, a guide unit 503 may include a guide recess formed on the plate 574. In addition, the guide recess may be formed by a flange moving part 575 formed on the plate 574 to protrude so as to enclose the flange portion. The flange moving part 575 may be coupled with the plate 574 by coupling parts 572. Each of the coupling parts 572 may be formed in a bolt shape. After the flange portion of the second adjusting part 554 is inserted into the guide recess, the flange of the second adjusting part 554 may be fixed to the guide recess by the screw-coupling of the coupling parts 572 in the bolt shape. However, the coupling parts 572 may take various structures capable of fixing the flange moving part 575 to the plate 574 without being limited to the bolt shape.

The flange portion is movable within the guide recess in a second direction perpendicular to the first direction. Here, the second direction is the z-axis. For example, the z-axis may be perpendicular to each of the x-axis and the y-axis. For example, the longitudinal direction of the guide recess may be the z-axis direction. However, the second direction may be the y-axis without being limited to the z-axis direction illustrated in FIG. 16.

As the second adjusting part 554 is moved along the z-axis direction as illustrated in FIG. 17, the display module 501 connected to the wearing unit 504 may be moved in the z-axis direction with reference to the eyeglass frame G.

As described above, according to yet another one of various embodiments of the present disclosure, the wearable electronic device 500 may optimize the focal points of the display modules 501 by moving and/or rotating the display modules 501 in relation to the eyeglass frame G with reference to the x-axis, the y-axis, and the z-axis using the detachment/attachment units 505 including the guide units 507.

Figure 18:
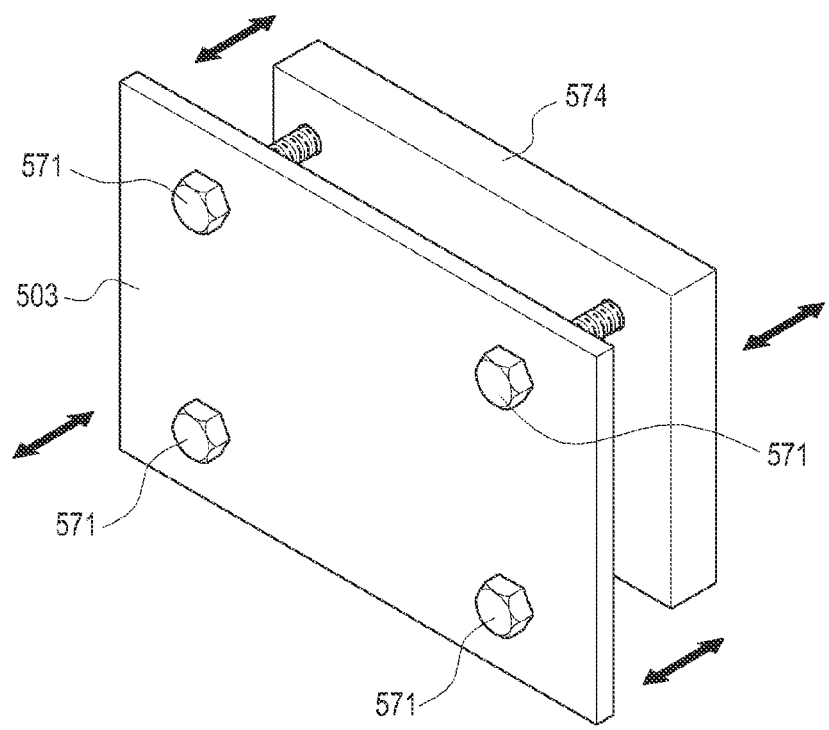
FIG. 18 is a perspective view illustrating a plate applied to a wearable electronic device according to an embodiment of the present disclosure.

FIG. 18 is a perspective view illustrating a plate applied to a wearable electronic device according to an embodiment of the present disclosure. Hereinafter, the operation of the plate 574 will be described with reference to FIGS. 16 and 18.

Referring to FIG. 18, first, in order to move the plate 574 in the x-axis direction, the plurality of guide bolts 571 may be rotated in the same direction. For example, the plate 574 may be moved to be parallel to the first inner wall 531 without being inclined within the wearing unit 504.

Meanwhile, when only one of the plurality of guide bolts 571 is rotated, the portion of the plate 574, which is fastened to the rotated guide bolt 571, is moved, and the portions of the plate 574, which are fastened to the non-rotated guide bolts 571, are maintained in the fixed state. When only one of the plurality of guide bolts 571 is rotated, the plate 574 may be maintained in an inclined state within the wearing unit 504. As a result, the second adjusting part 554, which is in contact with the plate 574, may be inclined similarly to the plate 574 so that the position of the eyeglass frame G connected to the second adjusting part 554, the first adjusting part 553, and the bodies 551 and 552 may be changed in relation to the wearing unit 504.

In addition, when the plate 574 is inclined in relation to the wearing unit 504 using the plurality of guide bolts 571, the focal points of the display modules 501 may be optimized by correcting the rotation in the y-axis using the second hinge 555.

Figure 19:
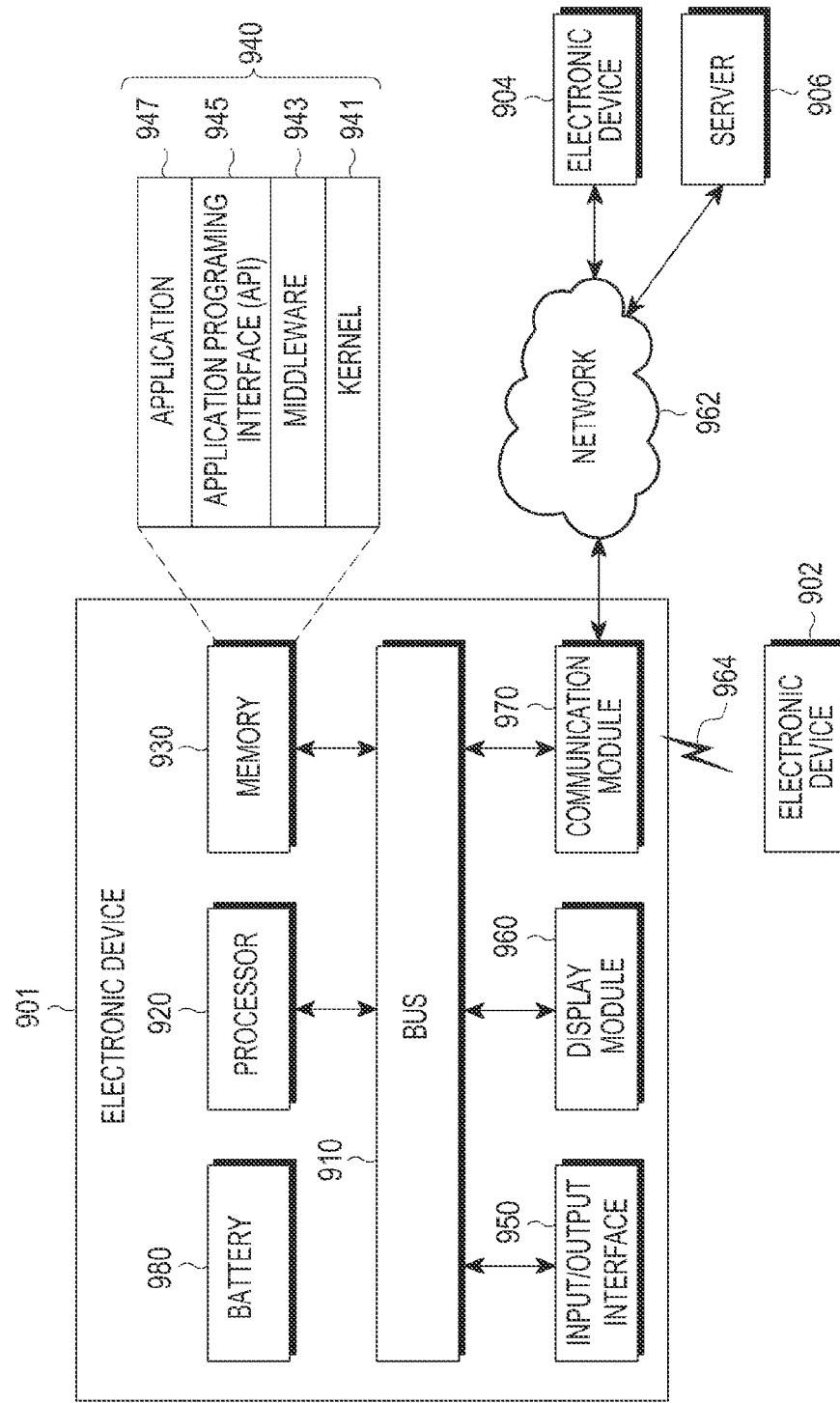
FIG. 19 is a view illustrating a network environment in which a wearable electronic device according to various embodiments of the present disclosure is operated Throughout the drawings, like reference numerals will be understood to refer to like parts, components, and structures.

FIG. 19 is a view illustrating a network environment in which a wearable electronic device according to various embodiments of the present disclosure is operated.

Referring to FIG. 19, an electronic device according to an embodiment of the present disclosure may, for example, include at least one of a wearable display device, a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3)

player, a mobile medical appliance, a camera, electronic clothes, an electronic bracelet, an electronic necklace, an electronic appcessory, an electronic tattoo, a smart mirror, a smart watch, and the like.

According to a further embodiment of the present disclosure, the electronic device may be a smart home appliance. The home appliance may include at least one of, for example, a television, a digital versatile disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or interne device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices.

Referring to FIG. 19, an electronic device 901 may include a bus 910, a processor 920, a memory 930, an input/output interface 950, a display module 960, a communication interface 970, and a battery 980. In a certain embodiment of the present disclosure, at least one of the components may be omitted from the electronic device 901 or the electronic device 901 may be additionally provided with another component.

The bus 910 may include a circuit that connects the above-discussed elements 910 to 970 and transmits communication (e.g., a control message and/or data) between the components.

The processor 920 may include one or more of a central processing unit (CPU), an application processor (AP), and a communication processor (CP). The processor 920 may execute, for example, an arithmetic operation or data processing related to a control and/or communication of one or more other components of the electronic device 901.

The memory 930 may include a volatile memory and/or a non-volatile memory. The memory 930 may store therein, for example, commands or data related to one or more components of the electronic device 901. According to one embodiment of the present disclosure, the memory 930 may store therein software and/or a program 940. The program 940 may include, for example, a kernel 941, a middleware 943, an application programming interface (API) 945, and/or an application program (or an "application") 947. At least some of the kernel 941 the middleware 943, and the API 945 may be referred to as an operating system (OS).

The kernel 941 may control or manage system resources (e.g., the bus 910, the processor 920, or the memory 930) used for executing operations or functions implemented the other programs (e.g., the middleware 943, the API 945, or the application program 947). In addition, the kernel 941 may provide an interface that allows the middleware 943, the API 945, or the applications 947 to access individual components of the electronic device 901 so as to control or manage the system recourses.

The middleware 943 may play an intermediary role such that the API 945 or the application program 947 may communicate with the kernel 941 so as to exchange data. In addition, in connection with task requests received from the application program 947, the middleware 943 may perform a control (e.g., scheduling or load balancing) for the task requests by using, for example, a method of assigning the priority capable of using a system resource of the electronic device 901 (e.g., the bus 910, the processor 920, or the memory 930) to at least one of the applications 947.

The API 945 is an interface for allowing the applications 947 to control functions provided by the kernel 941 or the middleware 943 and may include, for example, at least one interface or function (e.g., commands) for a file control, a window control, an image processing, or a text control, for example.

The input/output interface 950 may serve as an interface capable of delivering commands or data, entered by a user or an external device to the other component(s) of the electronic device 901. In addition, the input/output interface 950 may output commands or data received from the other component(s) of the electronic device 901 to the user or the external device.

The display module 960 may include, for example, a liquid crystal display (LCD), a light emitting diode (LED) display, an organic LED (OLED) display, or a microelectromechanical systems (MEMS) display, or an electronic paper display. The display module 960 displays various contents (e.g., text, image, video, icon, or symbol) to, for example, the user. The display module 960 may include a touch screen, and may receive a touch input, a gesture input, a proximity input or a hovering input using, for example, an electronic pen or a part of the user's body.

The communication interface 970 may set, for example, a communication between the electronic device 901 and an external electronic device (e.g., a first external electronic device 902, a second external device 904, or a server 906). For example, the communication interface 970 may communicate with the external device (e.g., the first external electronic device 902) through a wired or wireless communication 964 and the communication interface 970 may communicate with the external device (e.g., the second external electronic device 904 or the server 906) by being connected with a network 962 through a wired or wireless communication.

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro) and global system for mobile communications (GSM), as a cellular communication protocol, for example. The wired communication may use at least one of, for example, a universal serial bus (USB), a high definition multimedia interface (HDMI), recommended standard (232) (RS-232), and plain old telephone service (POTS). The network 962 may include a telecommunication network, for example, at least one of computer network (e.g., a local area network (LAN) or a wireless area network (WAN)), internet, telephone network, and the like.

Each of the first external electronic device 902 and the second external electronic device 904 may be a device that is the same or different type with the electronic device 901. According to one embodiment of the present disclosure, the server 906 may include a group of one or more servers. According to various embodiments of the present disclosure, all or some of the operations executed by the electronic device 901 may be executed by one or more other electronic devices (e.g., the first external electronic device 902 and the second external electronic device 904 or the server 906). According to one embodiment of the present disclosure, in a case where the electronic device 901 should perform a certain function or service automatically or by a request, the electronic device 901 may request some functions associated therewith from the other electronic devices (e.g., the first external electronic device 902 and the second external electronic device 904 or the server 906) instead of or in addition to executing the function or service by itself. The other electronic devices (e.g., the first external electronic device 902 and the second external electronic device 904 or the server 906) may execute the requested functions or additional functions, and transmit the results to the electronic device 901. The electronic device 901 may provide the requested functions or services by processing the received results as they are or additionally. For this purpose, for example, a cloud computing technique, a distributed computing technique, or a client-server computing technique, may be used.

The battery 980 may include a rechargeable battery and/or a solar battery. The battery 980 may supply power required by the electronic device.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
   a display configured to output an image;
   a wearing part connected with the display, wherein the wearing part is wearable on a user's body; and
   a detachment/attachment part configured to allow the wearing part to be detached from/attached to a user's eyeglass frame, the detachment/attachment part comprising:
   a first connection part connected to the eyeglass frame, and wherein the first connection part penetrates the eyeglass frame to be rotatable about a first rotation axis, and
   a second connection part connected to the wearing part, and wherein the second connection part penetrates the wearing part to be rotatable about a second rotation axis that is perpendicular to the first rotation axis,
   wherein, when rotated, the display moves along the first rotation axis in relation to the first connection part when rotated, and wherein, when rotated, the display moves along the second rotation axis in relation to the second connection part.

2. The wearable electronic device of claim 1,
wherein the first connection part comprises a first thread, and
wherein the wearing part further comprises a first fixing part screw-coupled to the first thread to limit the rotation of the first connection part in relation to the eyeglass frame.

3. The wearable electronic device of claim 1,
wherein the second connection part comprises a second thread, and
wherein the detachment/attachment part further comprises a second fixing part screw-coupled to the second thread to limit the rotation of the second connection part in relation to the wearing part.

4. The wearable electronic device of claim 1, wherein the detachment/attachment part is further configured to change the position of the display in relation to the eyeglass frame as the first and second connection parts are rotated.

5. The wearable electronic device of claim 4,
wherein the detachment/attachment part further comprises a case connected to the first and second connection parts, and a central part provided to be movable in the case,
wherein the first connection part comprises a first thread,
wherein the second connection part comprises a second thread,
wherein the case comprises first and second screw holes formed to correspond to the first and second screw threads, respectively, and
wherein the first and second connection parts are moved along the first and second screw holes, respectively.

6. The wearable electronic device of claim 5,
wherein the detachment/attachment part further comprises an anchoring bolt coupled to the case,
wherein an end of the anchoring bolt is provided within the case and formed of an elastic material, and
wherein the anchoring bolt is fixed to the case as being in contact with the central part within the case.

7. The wearable electronic device of claim 1,
wherein the detachment/attachment part comprises a first hinge coupled with the eyeglass frame in a hinged manner, a body connected with the first hinge, a first adjusting part connected to the body, a second adjusting part connected to the wearing part, and a second hinge that connects the first and second adjusting parts with each other in a hinged manner, and
wherein the position of the second adjusting part is changed in relation to the first adjusting part as the first and second hinges are rotated.

8. The wearable electronic device of claim 7,
wherein the body comprises a first body connected with the first adjusting part, a second body connected with the first hinge and moved within the first body, and an elastic part provided between the first body and the second body to limit the movement of the second body, and
wherein the position of the display is changed in relation to the eyeglass frame by adjusting the movement of the second body.

9. The wearable electronic device of claim 8, wherein the wearing part further comprises a guide part that changes the position of the second adjusting part.

10. The wearable electronic device of claim 9,
wherein the guide part comprises a plurality of guide bolts rotatably mounted in the wearing part, and a plate positioned within the wearing part and screw-coupled with the plurality of guide bolts such that, as at least one of the plurality of guide bolts is rotated, the plate being moved within the wearing part in a first direction, and
wherein another end of the second adjusting part is positioned to be in contact with the plate to be moved within the wearing part together with the plate.

11. The wearable electronic device of claim 10,
wherein the second adjusting part comprises a flange portion protruding in a direction parallel to the plate from the another direction of the second adjusting part,
wherein the guide part comprises a guide recess formed on the plate, and
wherein the flange portion is moved in the guide recess in a second direction perpendicular to the first direction.

12. The wearable electronic device of claim 1, wherein the wearing part further comprises a neck band worn on a user's neck.

13. The wearable electronic device of claim 12, further comprising:
a circuit board provided in the neck band configured to control the display; and
a battery provided in the neck band configured to supply power to the display and the circuit board.

14. The wearable electronic device of claim 1, further comprising;
a circuit board provided in the wearing part configured to control the display;
a battery provided in the wearing part configured to supply power to the display and the circuit board; and
a power connection part configured to electrically connect a plurality of circuit boards, the plurality of circuit boards and the display, or the battery and the display.

* * * * *